(12) United States Patent
Candelaria et al.

(10) Patent No.: US 7,934,122 B2
(45) Date of Patent: Apr. 26, 2011

(54) TERMINATE OPERATIONS FOR COMPLEX I/O LINK

(75) Inventors: Susan Kay Candelaria, Tucson, AZ (US); Clint Alan Hardy, Tucson, AZ (US); Roger Gregory Hathorn, Tucson, AZ (US); Matthew Joseph Kalos, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/189,568

(22) Filed: Aug. 11, 2008

(65) Prior Publication Data

US 2010/0037098 A1 Feb. 11, 2010

(51) Int. Cl.
*G06F 11/00* (2006.01)
(52) U.S. Cl. .................. 714/15; 714/4; 714/10; 714/18; 714/43; 714/56
(58) Field of Classification Search .............. 714/4, 10, 714/15, 18, 23, 46, 56
See application file for complete search history.

(56) References Cited

U.S. PATENT DOCUMENTS

| | | | |
|---|---|---|---|
| 5,345,583 A | 9/1994 | Davis | |
| 7,203,758 B2 | 4/2007 | Cook et al. | |
| 2003/0105986 A1 * | 6/2003 | Elko et al. | 714/4 |
| 2004/0064542 A1 * | 4/2004 | Williams | 714/43 |
| 2004/0165588 A1 * | 8/2004 | Pandya | 370/389 |
| 2006/0230207 A1 * | 10/2006 | Finkler | 710/240 |
| 2007/0255877 A1 | 11/2007 | Guo et al. | |

OTHER PUBLICATIONS

Hanson et al., "A Flexible and Recoverable Client/Server Database Event Notification System," The VLDB Journal, 1998, vol. 7, pp. 12-24.
Tatebe et al., "Design and Implementation of FMPL, a Fast Message-Passing Library for Remote Memory Operations," SC2001, Nov. 2001, Denver 1-58113-293-X/01/0011, pp. 1-10.
Maselli, "CRM Goes Wireless," InformationWeek, May 27, 2002, 1 page.
Bhansali et al., "Framework for Instruction-Level Tracing and Analysis of Program Executions," VEE, Jun. 14-16, 2006, pp. 154-163.

* cited by examiner

*Primary Examiner* — Robert Beausoliel
*Assistant Examiner* — Joseph D Manoskey
(74) *Attorney, Agent, or Firm* — Griffiths & Seaton PLLC

(57) ABSTRACT

Method, system and computer program product embodiments for, in an input/output (I/O) link handling complex instruction chains, a messaging scheme incorporating a method of error recovery between an initiator processor and a receiver processor, are provided. An operation initiation message is been sent from the initiator processor to the receiver processor for the receiver processor to begin work on an operation. If determined to be necessary, a terminate operation message is sent from the initiator processor to the receiver processor. The initiator processor withholds sending additional messages for the operation until a terminate operation response message is received. Once the terminate operation message is received, outstanding messages in process are flushed from the receiver processor. The receiver processor withholds sending additional messages to the initiator processor as the outstanding messages are completed. The terminate operation response message is sent from the receiver processor to the initiator processor.

20 Claims, 4 Drawing Sheets

TERMINATE OPERATIONS FOR COMPLEX I/O LINK

BACKGROUND OF THE INVENTION

1. Field of the Invention

The present invention relates in general to computers, and more particularly to a messaging scheme incorporating an error handling mechanism for an input/output (I/O) link handling complex instruction chains.

2. Description of the Related Art

Computers and computer systems are found in a variety of settings in today's society. Computing environments and networks may be found at home, at work, at school, in government, and in other settings. In many computer systems, an operating system (OS) helps to share computer resources (processor, memory, disk space, network bandwidth, etc.) between users and application programs. Operating systems may also control access to the computer system in a security-related function Input/output (I/O) operations are used to transfer data between memory and input/output devices of a processing environment. Specifically, data is written from memory to one or more input/output devices, and data is read from one or more input/output devices to memory by executing input/output operations.

To facilitate processing of input/output operations, an input/output subsystem of the processing environment is employed. The input/output subsystem is coupled to main memory and the input/output devices of the processing environment and directs the flow of information between memory and the input/output devices. One example of at input/output subsystem is a channel subsystem. The channel subsystem uses channel paths as communications media. Each channel path includes a channel coupled to a control unit, the control unit being further coupled to one or more input/output devices.

The channel subsystem employs channel command words to transfer data between the input/output devices and memory. A channel command word specifies the command to be executed, and for commands initiating certain I/O operations, it designates the memory area associated with the operation, the action to be taken whenever transfer to or from the area is completed, and other options.

During input/output processing, a list of channel command words is fetched from memory by a channel. The channel parses each command from the list of channel command words and forwards a number of the commands, each command in it's own entity to a control unit (processor) coupled to the channel. The control unit then processes the commands. The channel tracks the state of each command and controls when the next set of commands are to be sent to the control unit for processing. The channel ensures that each command is sent to the control unit in it's own entity. Further, the channel infers certain information associated with processing.

SUMMARY OF THE INVENTION

In a complex input/output (I/O) link having a host adapter with a processor and a Symmetric Multi-Processor (SMP) processor, the work is split between the two processors with the host adapter performing link handling. One processor sends a message to initiate work on the other processor and receives response messages in a defined sequence. For performance, there may be more than one message pair (request/response) in flight at a time for a single operation. FIG. 1 shows a sample message exchange pair. Host adapter 10 sends a message 14 to SMP processor 12. The SMP processor 12 sends a message acknowledgement (ACK) 16 to the host adapter 10.

Further complexity occurs during the initiation of an operation where the initiating processor has sent the initiation message but not yet received a response. In this state, it is not always clear the order in which non-initiating process will process a new message. Error recovery in such a messaging scheme becomes difficult, as the messages in flight must be accounted for. The clean up for a particular operation depends on the state on both processors. This state, however, changes due to the messages in flight.

In light of the foregoing, a need exists for a messaging scheme for a complex I/O link implementing an error recovery mechanism that helps to alleviate the difficulty described above. Accordingly, in one embodiment, by way of example only, a method for, in an input/output (I/O) link handling complex instruction chains, a messaging scheme incorporating a method of error recovery between an initiator processor and a receiver processor, is provided. An operation initiation message is sent from the initiator processor to the receiver processor for the receiver processor to begin work on an operation. If determined to be necessary, a terminate operation message is sent from the initiator processor to the receiver processor. The initiator processor withholds sending additional messages for the operation until a terminate operation response message is received. Once the terminate operation message is received, outstanding messages in process are flushed from the receiver processor. The receiver processor withholds sending additional messages to the initiator processor as the outstanding messages are completed. The terminate operation response message is sent from the receiver processor to the initiator processor.

In an additional embodiment, again by way of example only, a system for implementing a messaging scheme incorporating an error recovery mechanism in an input/output (I/O) link handling complex instruction chains is provided. The system includes an initiator processor. A receiver processor is in communication with the initiator processor. An operation initiation message is sent from the initiator processor to the receiver processor for the receiver processor to begin work on an operation. The initiator processor is adapted for, if determined to be necessary, sending a terminate operation message to the receiver processor, and withholding sending additional messages for the operation until a terminate operation response message is received. The receiver processor is adapted for, once the terminate operation message is received, flushing outstanding messages in process, withholding sending additional messages to the initiator processor as the outstanding messages are completed, and sending the terminate operation response message to the initiator processor.

In still another embodiment, again by way of example only, a computer program product for, in an input/output (I/O) link handling complex instruction chains, a messaging scheme incorporating a method of error recovery between an initiator processor and a receiver processor, is provided. An operation initiation message is sent from the initiator processor to the receiver processor for the receiver processor to begin work on an operation. The computer program product comprises a computer-readable storage medium having computer-readable program code portions stored therein. The computer-readable program code portions comprise a first executable portion for, if determined to be necessary, sending a terminate operation message from the initiator processor to the receiver processor, the initiator processor withholding sending additional messages for the operation until a terminate operation response message is received, a second executable portion for, once the terminate operation message is received, flushing outstanding messages in process from the receiver processor, the receiver processor withholding sending additional messages to the initiator processor as the outstanding messages are completed, and a third executable portion for sending the terminate operation response message from the receiver processor to the initiator processor.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The exemplary embodiments described below provide a messaging protocol for an input/output (I/O) link handling long and complex chains of instructions. The messaging protocol inserts a "terminate operation" message exchange into message exchanges in flight. This "terminate operation" exchange provides the following. First, messages in flight are flushed in both directions (e.g., to receiver from initiator, and from receiver to initiator). The processor which initiated the operation sends a "terminate operation" message" and will send no further messages for this operation until a response is received. Second, a simple, well-understood sync barrier is maintained while the original message exchange completes. Once the exchange completes, each processor is aware that no new messages will be generated. As a result, each processor is able clean up applicable control blocks and states for the operation without further communication handshakes. A recovery complete message may then be sent from the receiver to the initiator to indicate that the operation is completely terminated.

Figure 1:
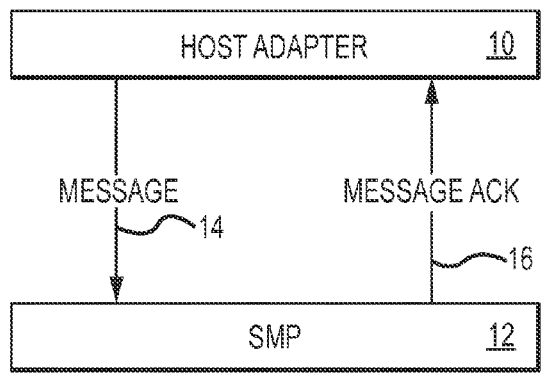
FIG. 1 depicts an exemplary message exchange pair between a host adapter processor and a Symmetric Multi-Processor (SMP)
Figure 2:
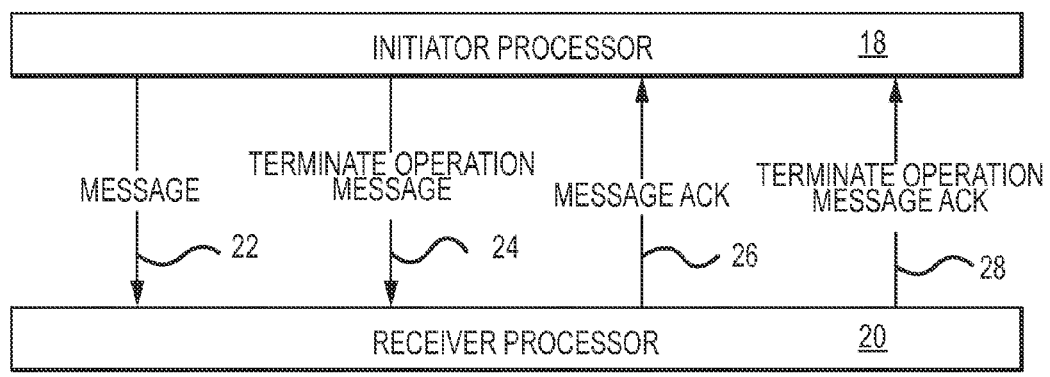
FIG. 2 depicts an exemplary terminate operation message exchange pair between an initiator processor and a receiver processor.

The first phase of processing begins when the initiator of the operation sends a terminate operation message. FIG. 2 shows an exemplary terminate operation message exchange pair between an initiator processor 18 and a receiver processor 20. Initiator 18 sends message 22. The receiver 20 receives the message 22, and in response, sends a message response or acknowledgment (ACK) 26. The initiator 18 sends terminate operation message 24. The initiator 18 does not send any further messages for the operation until it has received a response message. The receiver 20 receives the terminate operation message 24, and sends a terminate operation message ACK 28. In similar fashion to the initiator 18, once the terminate message operation message 24 is received, the receiver 20 does not send any further messages.

The messaging scheme depicted in FIG. 2 is ordered. However, the processors involved may be Symmetric Multi-Processors (SMPs), so the execution order of the messages is not guaranteed. Standard techniques such as sequence numbers may be used to ensure the messages are processed in order. In the depicted embodiment, however, it is only required to know that there is a valid message that was sent by the initiator but not yet processed by the receiver.

To accommodate the scenario described above, a sequence number may be incorporated into the message, and a maximum sequence number may be incorporated into the terminate operation message. This allows messages to be processed out-of-order, and allows the processor which receives the terminate operation message to become aware of how many in-flight messages must be processed before beginning operation cleanup. In embodiments where uni-processors are utilized, out-of-order message processing is not an issue.

In one embodiment, message order processing may be handled by serialization through a task control block (TCB). If the normal message is processed before the terminate message, a response will be sent. If the terminate message is processed first, the task control block is marked as terminated and a response to the normal message is not sent.

Consider the following exemplary scenario involving a host adapter acting as an initiator processor and an SMP processor acting as a receiver processor. At the beginning of an operation, the host adapter sends an operation initiation message to the SMP processor. The SMP processor may reject the operation with a response, begin execution of the operation immediately, or queue the operation to be executed later. A terminate operation message may "race" with the operation initiation message. If the SMP processor has not yet completed processing of the initiation message, it returns a "no operation" response indicating a race has occurred and the host adapter retries the terminate operation message. If the operation is not known because it was rejected, the host adapter will receive the rejection message and determine there is no termination to be performed with the SMP. This retry loop may persist for a reasonable timeout period. The terminate operation message is retried until either the operation is rejected or is successfully terminated.

Figure 3:
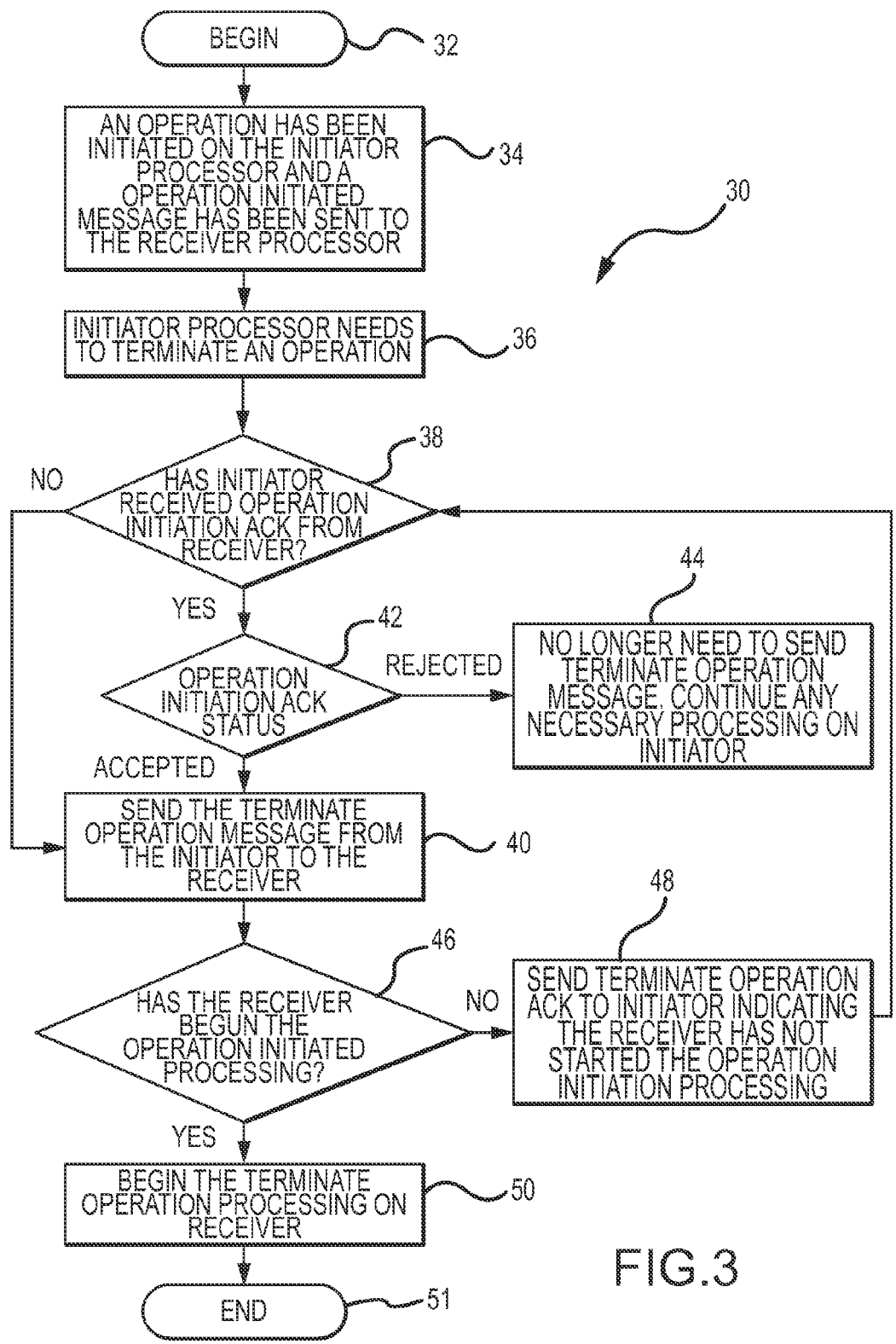
FIG. 3 depicts an exemplary operation initiation and terminate operation race processing.

FIG. 3, following, depicts this "race" scenario as a method 30. As one skilled in the art will appreciate, various steps in the following methods may be implemented in differing ways and orders to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 30 begins (step 32) with an operation being initiated on the initiator processor. Once the operation is initiated, an operation initiation message is sent to the receiver processor (step 34). The initiator processor then determines that the operation needs to be terminated (step 36). The initiator then queries whether the operation initiation response (ACK) has been received from the receiver (step 38) indicating that the receiver has received the operation initiation message. If no, then the initiator determines that a terminate operation message is necessary, and sends the message to the receiver (step 40). If yes, the initiator checks the operation initiation response status (step 42). If the operation is rejected by the receiver, then the initiator determines that it is no longer necessary to send the terminate operation message (step 44), and the initiator continues any necessary processing.

If the operation initiation response status indicates that the message was accepted (again, step 42), then the initiator again may conclude that the terminate operation message is needed. Accordingly, the terminate operation message is sent (again, step 40).

Method 30 then queries if the receiver has begun the operation initiated processing (step 46). If no, the receiver sends a terminate operation response (ACK) to the initiator indicating that the receiver has not started the operation initiation processing, and the method 30 retries sending the terminate operation message (again, step 40) until the message is rejected (step 44) or until a timeout period has expired or a number of retries have occurred. In this way, retrying sending the terminate operation message is bounded by either a predetermined number of retries or the passage of a predetermined time. If the receiver has begun operation initiated processing (again, step 46), then the receiver begins terminate operation processing (step 50). The method 30 then ends (step 51).

Once the terminate operation message is received, the receiver waits for any unprocessed message to complete. At this point the receiver processor is in the same state as the sending processor since there are no outstanding messages. The receiver processor immediately stops sending messages to the sender processor. Similarly, the sending processor withholds sending additional messages until a response has been received. The receiver processor can optionally immediately send the terminate operation response or wait until all unprocessed messages are handled.

Once this well-understood sync barrier is established between initiator and receiver, the receiver processor can begin recovering the operation. For a control unit in one embodiment, this involves releasing access to blocks of data which were given to the host adapter, recovering the device state, freeing resources, and the like.

Upon receipt of the terminate operation response, the initiator can account for outstanding messages as described above and can begin cleaning up its state for the operation, releasing direct memory access (DMA) control blocks, buffers, and completing any I/O link responses as required.

After the initiator has completed its recovery, the initiator may send a termination operation complete message to the receiver to reset any residual state information relative to the device that was performing the termination. In alternate implementations, this message is not required.

Figure 4:
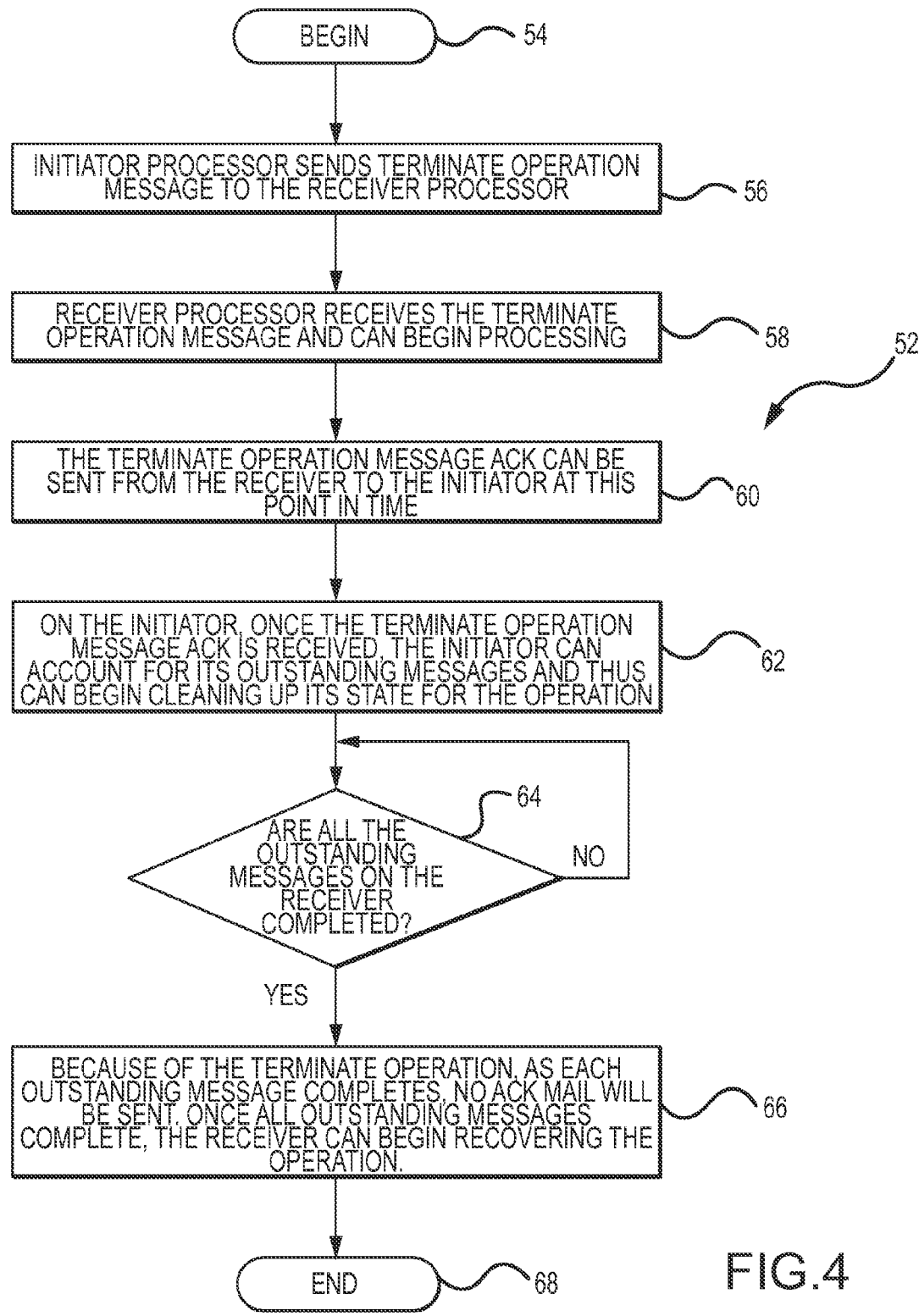
FIG. 4 depicts exemplary terminate operation processing.

FIG. 4, following, illustrates an exemplary terminate operation processing 52 following the sending of a terminate operation message. Processing 52 begins (step 54) with the initiator processor sending the terminate operation message to the receiver processor (step 56). The receiver processor receives the terminate operation message and can begin processing (step 58). Accordingly, the terminate operation response (ACK) can be sent from the receiver to the initiator (step 60). In the depicted embodiment, this ACK is sent immediately following the receipt of the terminate operation message.

On the initiator, once the terminate operation response has been received, the initiator accounts for outstanding messages and may begin cleaning up its state for the operation (step 62). If all the outstanding messages on the receiver have been processed (completed) (step 64), then the receiver may begin recovering the operation (step 66). Because of the terminate operation, as each outstanding message is processed, no ACK mail will be sent by the receiver (or initiator). The processing 52 then ends (step 68) and the receiver sends an optional terminate operation complete message to the initiator.

Figure 5:
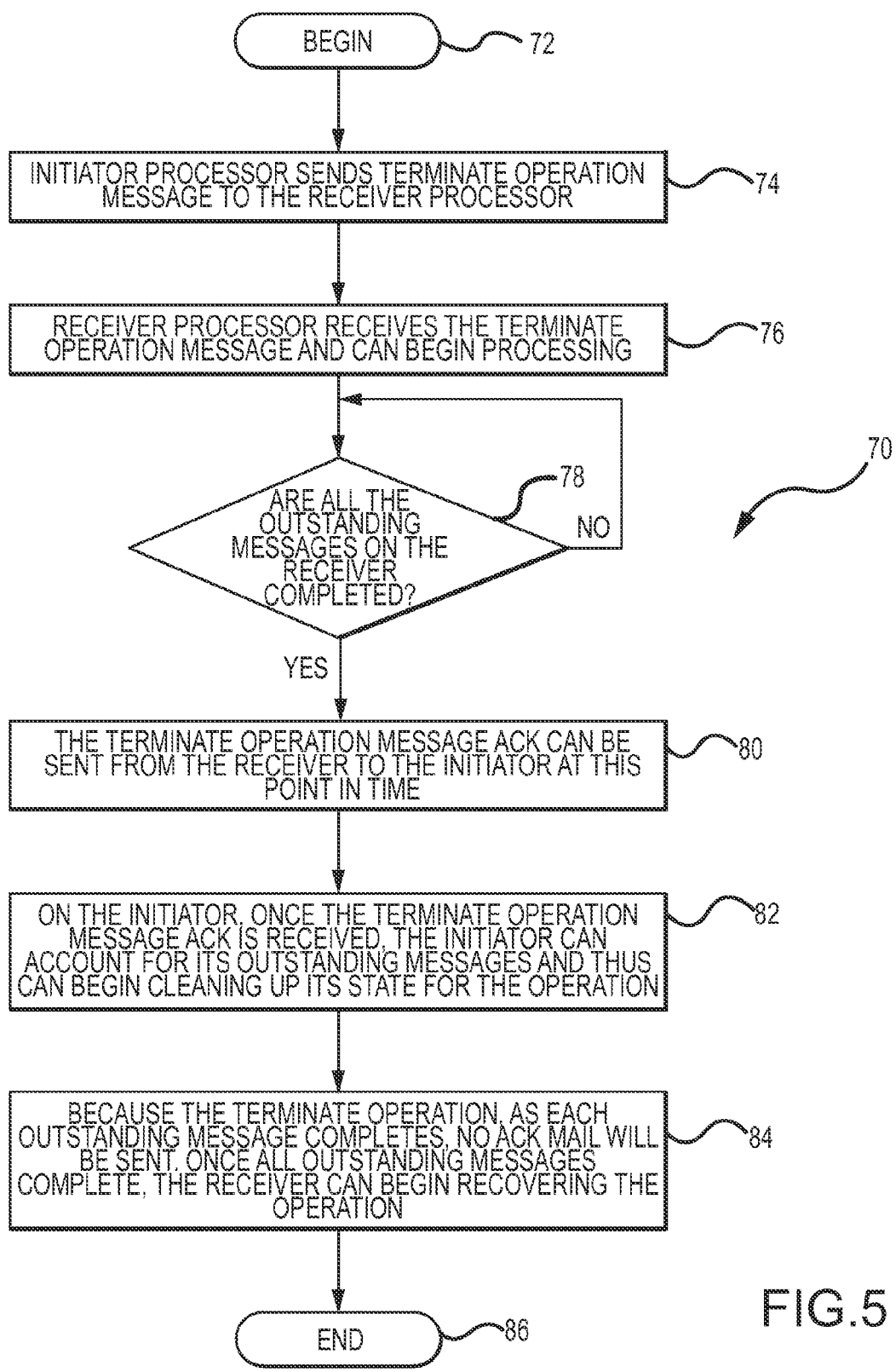
FIG. 5 depicts additional exemplary terminate operation processing.

FIG. 5, following, illustrates a second exemplary terminate operation processing 70 where the termination operation response (ACK) is sent following a determination that all outstanding messages on the receiver have been completed. Processing 70 proceeds similarly to the processing 52 previously described in FIG. 4, where once begun (step 72), the initiator processor sends a terminate operation message to the receiver processor (step 74). The receiver processor receives the terminate operation message and can begin processing (step 76). If it is determined that all outstanding messages on the receiver have been completed (step 78), then the terminate operation response is sent (step 80), and on the initiator, once the terminate operation response has been received, the initiator may account for its outstanding messages and thus can begin cleaning up its state for the operation (step 82). As each outstanding message completes, or is accounted for, no ACK mail is sent. Once all outstanding messages are completed, the receiver begins recovering the operation (step 84), and the processing 70 ends (step 86) with the sending of an optional terminate operation complete message to the initiator.

While one or more embodiments of the present invention have been illustrated in detail, the skilled artisan will appreciate that modifications and adaptations to those embodiments may be made without departing from the scope of the present invention as set forth in the following claims.

What is claimed is:

1. In an input/output (I/O) link handling complex instruction chains, a messaging scheme incorporating a method of error recovery between an initiator processor and a receiver processor, an operation initiation message having been sent from the initiator processor to the receiver processor for the receiver processor to begin work on an operation, the method comprising:
   if determined to be necessary, sending a terminate operation message from the initiator processor to the receiver processor, the initiator processor withholding sending additional messages for the operation until a terminate operation response message is received;
   once the terminate operation message is received, flushing outstanding messages in process from the receiver processor, the receiver processor withholding sending additional messages to the initiator processor as the outstanding messages are completed; and
   sending the terminate operation response message from the receiver processor to the initiator processor.

2. The method of claim 1, further including subsequent to sending the terminate operation response message from the receiver processor to the initiator processor, recovering the operation by the receiver processor.

3. The method of claim 1, further including upon a receipt of the terminate operation response message, accounting for the outstanding messages by the initiator processor.

4. The method of claim 1, wherein sending the terminate operation response message is performed one of immediately following receipt of the terminate operation message and subsequent to completion of the outstanding messages by the receiver processor.

5. The method of claim 1, further including determining if the terminate operation message need be sent.

6. The method of claim 5, wherein determining if the terminate operation message need be sent includes:

determining if an operation initiation response message has been received by the initiator processor in response to sending the operation initiation message, wherein if the operation initiation response message has not been received, sending the terminate operation message, otherwise:
  determining a status of the operation initiation response, wherein:
    if the status indicates a rejection by the receiver processor, withholding the terminate operation message, and
    if the status indicates an acceptance by the receiver processor, sending the terminate operation message.

7. The method of claim 6, further including, subsequent to receiving the terminate operation message from the initiator processor:
  determining if the receiver processor has begun work on the operation, wherein if the receiver processor has not begun work:
    sending the terminate operation response message to the initiator processor indicating the receiver processor has not begun work, and
    resending the terminate operation message by the initiator processor, wherein the resending the terminate operation message by the initiator processor is bounded by one of a number of retries or a passage of time.

8. In an input/output (I/O) link handling complex instruction chains, a system for implementing a messaging scheme incorporating an error recovery mechanism, the system comprising:
  an initiator processor; and
  a receiver processor in communication with the initiator processor, an operation initiation message having been sent from the initiator processor to the receiver processor for the receiver processor to begin work on an operation, wherein the initiator processor is adapted for:
    if determined to be necessary, sending a terminate operation message to the receiver processor, and
    withholding sending additional messages for the operation until a terminate operation response message is received, and
  the receiver processor is adapted for, once the terminate operation message is received:
    flushing outstanding messages in process,
    withholding sending additional messages to the initiator processor as the outstanding messages are completed, and
    sending the terminate operation response message to the initiator processor.

9. The system of claim 8, wherein the receiver processor is further adapted for, subsequent to sending the terminate operation response message to the initiator processor, recovering the operation.

10. The system of claim 8, wherein the initiator processor is further adapted for, upon a receipt of the terminate operation response message, accounting for the outstanding messages.

11. The system of claim 8, wherein the receiver processor is further adapted for sending the terminate operation response message one of immediately following receipt of the terminate operation message and subsequent to completion of the outstanding messages.

12. The system of claim 8, wherein the initiator processor is further adapted for determining if the terminate operation message need be sent.

13. The system of claim 12, wherein the initiator processor is further adapted for:
  determining if an operation initiation response message has been received in response to sending the operation initiation message, wherein if the operation initiation response message has not been received, sending the terminate operation message, otherwise:
    determining a status of the operation initiation response, wherein:
      if the status indicates a rejection by the receiver processor, withholding the terminate operation message, and
      if the status indicates an acceptance by the receiver processor, sending the terminate operation message.

14. The system of claim 13, wherein the initiator processor is further adapted for, subsequent to the receiver processor receiving the terminate operation message:
  determining if the receiver processor has begun work on the operation, wherein if the receiver processor has not begun work:
    the receiver processor is further adapted for sending the terminate operation response message to the initiator processor indicating the receiver processor has not begun work, and
    the initiator processor is further adapted for resending the terminate operation message to the receiver processor, wherein the resending the terminate operation message to the receiver processor is bounded by one of a number of retries or a passage of time.

15. A computer program product for, in an input/output (I/O) link handling complex instruction chains, a messaging scheme incorporating a method of error recovery between an initiator processor and a receiver processor, an operation initiation message having been sent from the initiator processor to the receiver processor for the receiver processor to begin work on an operation, the computer program product comprising a computer-readable storage medium having computer-readable program code portions stored therein, the computer-readable program code portions comprising:
  a first executable portion for, if determined to be necessary, sending a terminate operation message from the initiator processor to the receiver processor, the initiator processor withholding sending additional messages for the operation until a terminate operation response message is received;
  a second executable portion for, once the terminate operation message is received, flushing outstanding messages in process from the receiver processor, the receiver processor withholding sending additional messages to the initiator processor as the outstanding messages are completed; and
  a third executable portion for sending the terminate operation response message from the receiver processor to the initiator processor.

16. The computer program product of claim 15, further including:
  a fourth executable portion for, subsequent to sending the terminate operation response message from the receiver processor to the initiator processor, recovering the operation by the receiver processor, and
  a fifth executable portion for, upon a receipt of the terminate operation response message, accounting for the outstanding messages by the initiator processor.

17. The computer program product of claim 15, wherein the third executable portion for sending the terminate operation response message is executed one of immediately following receipt of the terminate operation message and subsequent to completion of the outstanding messages by the receiver processor.

18. The computer program product of claim 15, further including a fourth executable portion for determining if the terminate operation message need be sent.

19. The computer program product of claim 18, wherein the fourth executable portion for determining if the terminate operation message need be sent includes:
- a fifth executable portion for determining if an operation initiation response message has been received by the initiator processor in response to sending the operation initiation message, wherein if the operation initiation response message has not been received, sending the terminate operation message, otherwise:
  - determining a status of the operation initiation response, wherein:
    - if the status indicates a rejection by the receiver processor, withholding the terminate operation message, and
    - if the status indicates an acceptance by the receiver processor, sending the terminate operation message.

20. The computer program product of claim 18, further including a sixth executable portion for, subsequent to receiving the terminate operation message:
- determining if the receiver processor has begun work on the operation, wherein if the receiver processor has not begun work:
- sending the terminate operation response message to the initiator processor indicating the receiver processor has not begun work, and
- resending the terminate operation message by the initiator processor, the resending the terminate operation message bounded by one of a number of retries or a passage of time.

* * * * *